I. HECHENBLEIKNER.
MANUFACTURE OF MONO AND DI-AMMONIUM PHOSPHATE.
APPLICATION FILED FEB. 10, 1917.
1,264,514.
Patented Apr. 30, 1918.
2 SHEETS—SHEET 1.
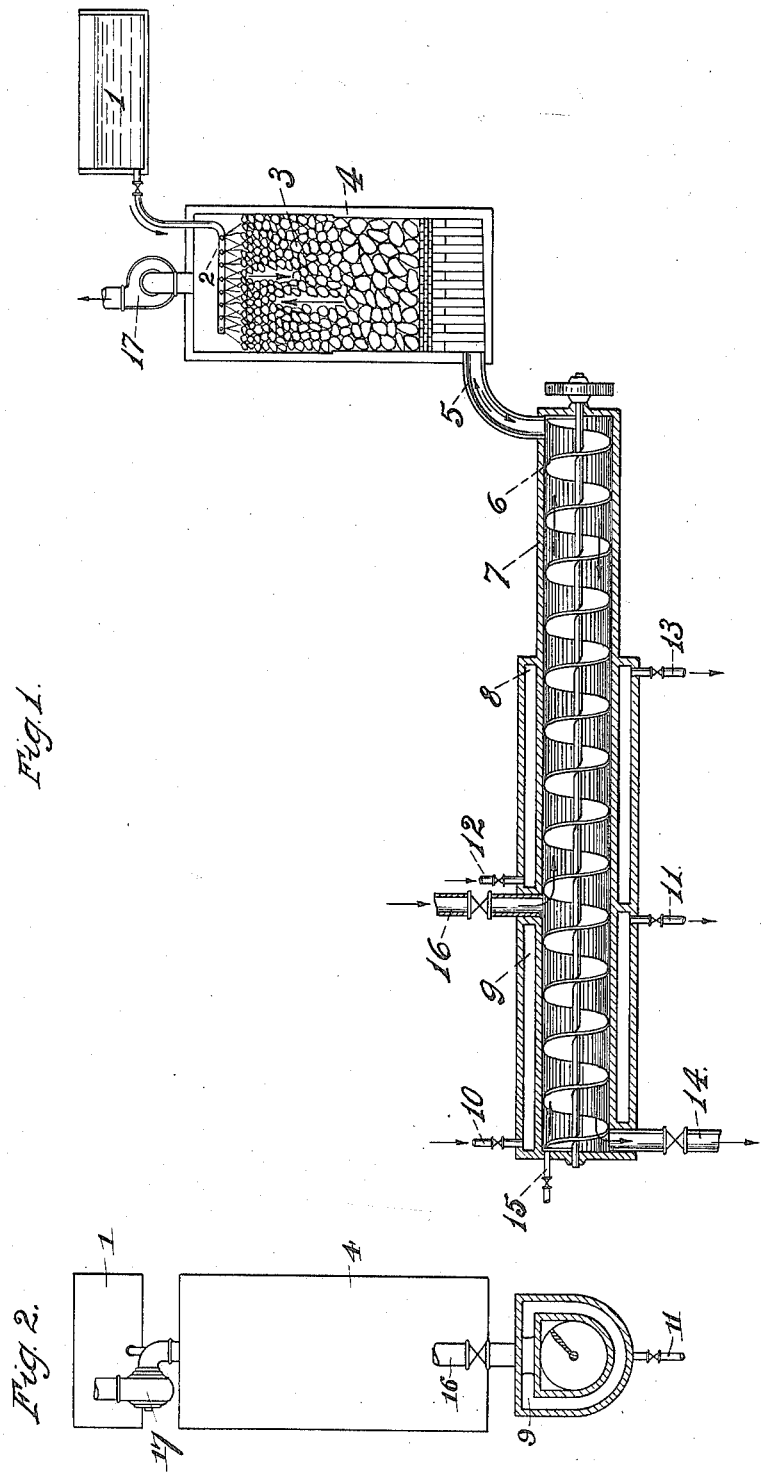

I. HECHENBLEIKNER.
MANUFACTURE OF MONO AND DI-AMMONIUM PHOSPHATE.
APPLICATION FILED FEB. 10, 1917.
1,264,514.
Patented Apr. 30, 1918.
2 SHEETS—SHEET 2.
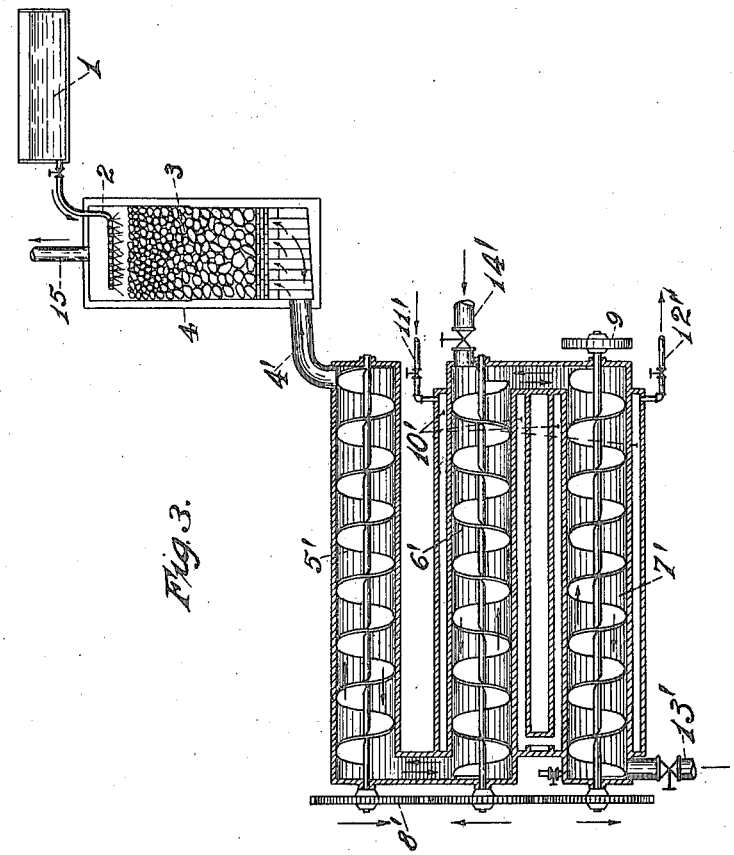
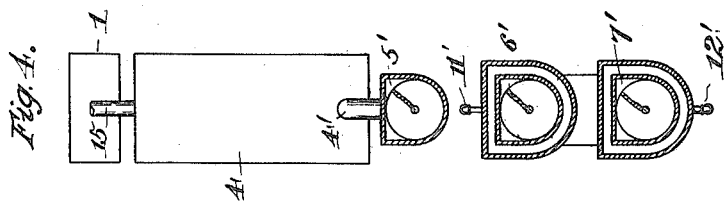
Witnesses.
Inventor,
By his Attorneys,

UNITED STATES PATENT OFFICE.

INGENUIN HECHENBLEIKNER, OF CHARLOTTE, NORTH CAROLINA, ASSIGNOR TO SOUTHERN ELECTRO-CHEMICAL COMPANY, OF NEW YORK, N. Y., A CORPORATION OF NEW JERSEY.

MANUFACTURE OF MONO AND DI-AMMONIUM PHOSPHATE.

1,264,514. Specification of Letters Patent. Patented Apr. 30, 1918.

Application filed February 10, 1917. Serial No. 147,965.

*To all whom it may concern:*

Be it known that I, INGENUIN HECHENBLEIKNER, a citizen of the United States, residing at Charlotte, in the county of Mecklenburg and State of North Carolina, have invented certain new and useful Improvements in the Manufacture of Mono and Di-Ammonium Phosphate, of which the following is a specification.

This invention relates to the manufacture of mono and di-ammonium phosphate.

In my co-pending application, Ser. No. 147,964, filed February 10, 1917, I have described an apparatus and process for the manufacture of these substances and in said application I have set forth in detail the strength of acid preferably employed, as well as the chemical practice followed in the production of the mono and di-ammonium phosphate.

In the present instance I am enabled to produce a dry mono or di-ammonium phosphate in one operation from diluted phosphoric acid and ammonia, employing but a single unitary apparatus for the purpose of producing a dry, fine crystalline product of important stable and non-hygroscopic qualities.

Furthermore, I employ the same apparatus in the manufacture of both mono and di-ammonium phosphate, the only difference being that in the case of mono-ammonium phosphate the temperature of drying is between 100 and 150 deg. C. while with the di-ammonium phosphate the final drying is done at a temperature below 100 deg. C., as any higher temperature would result in decomposition of the di-ammonium phosphate into mono-ammonium phosphate and ammonia.

As set forth in said co-pending application the diluted phosphoric acid is preferably a solution ranging from 35% to 43% strength of acid and the ammonia is preferably supplied to the solution in the form of a gas, the gas from the saturation tank passing through a suitable absorption system counter-current to or in an opposite direction to a stream of the diluted phosphoric acid flowing through the tower.

In the accompanying drawings,

Figure 1 is a vertical sectional view taken through one form of apparatus for carrying out my process of manufacturing mono and di-ammonium phosphate.

Fig. 2 is an end view partly in section.

Fig. 3 is a vertical longitudinal sectional view of a modified form of apparatus.

Fig. 4 is an end view thereof partly in section.

Referring now to the accompanying drawings in detail, and particularly to Figs. 1 and 2 thereof, the numeral 1 indicates a suitable receptacle which is adapted to contain the diluted phosphoric acid, preferably of about 39% concentration. From this receptacle the acid flows through an acid distributer 2, by which it is showered or distributed onto a suitable packing 3 which is arranged within the absorption tower 4 and is so constructed as to properly distribute the gas and acids, the tower 4 having a gas flue 5 forming a communication between the tower and the saturation tank. The latter embraces a casing 7 in which operates a screw conveyer 6, which is driven in any suitable manner. The central portion of the casing 7 is surrounded by a steam jacket 8, while one of the end portions of such casing is also surrounded by the steam jacket 9 to which steam is admitted through a supply pipe 10, and any water which is condensed in the jacket 9 may be removed through the drain pipe 11. Likewise, the steam jacket 8 is provided with a steam supply pipe 12 and a water drain pipe 13. The screw conveyer is intended to feed the resulting crystals from right to left so as to finally feed or force the crystals through the valved discharge outlet 14. The numeral 15 indicates a valved air inlet pipe leading into the casing 7 while at 16 is shown a valved supply pipe for admitting the ammonia gas into the casing. At the top portion of the tower 4 is located an exhaust fan for removing the gases or vapors from the apparatus, the function of the fan of course being to draw such gases or vapors through the casing 7, pipe 5 and up through the packing 3.

The operation of the apparatus shown in Fig. 1 is substantially as follows: The phosphoric acid preferably of approximately 39% $P_2O_5$ is placed in the receptacle 1 and flows continuously through the distributer 2 and down through the packing 3 of the absorption tower 4. As the diluted phosphoric acid is flowing down it is well distributed through the packing 3 and absorbs all traces of ammonia from the upflowing gases and at the same time the acid is preheated by the heat of such gases. The waste gases and vapors are removed from the system through the exhaust fan 17. The preheated phosphoric acid, containing some ammonia absorbed from the gases, runs continuously down through the flue 5 into the casing 7 and the screw conveyer running in the direction before mentioned takes the material from the connecting pipe 5 toward the outlet 14. At the first section of the screw conveyer, or that nearest the flue 5, the ammonia gas entering the casing 7 through the pipe 6 is neutralized by the acid entering the casing 7 through the flue 5, at the same time rapidly evaporating the water through the heat developed by neutralization. This part of the apparatus is preferably insulated to utilize as much as possible of the heat neutralization. The material containing the mono and di-ammonium phosphate crystals and liquid is brought continuously to the part of the screw conveyer which is surrounded by the steam jacket 8. In this central portion of the conveyer more water is evaporated, partly through the action of the heated jacket and partly through the neutralization heat generated by the ammonia entering in through the feed inlet 16. As soon as the partly dried mono or di-ammonium phosphate reaches the section of the screw conveyer surrounded by the steam jacket 9 the last of the moisture is evaporated and also the free ammonia in the mono or di-ammonium phosphate so that the latter two products, leaving the screw conveyer at the discharge 14 will be found to be entirely dry and free from ammonia. The valved air pipe 15 is provided to regulate the amount of air which is permitted to enter the casing 7, and which air assists in freeing the mono or di-ammonium phosphate from the ammonia and moisture.

The result is that in one continuous operation I am enabled to produce mono and di-ammonium phosphate which will be found to be of a fine, dry, crystalline nature, stable and non-hygroscopic.

In Figs. 3 and 4 I have shown a modified form of apparatus, and in this case I also employ the phosphoric acid contained in the receptacle 1, the distributer 2 and the absorption tower 4 containing the packing 3 into which tower the gases pass in an upward path, the diluted acid gas flowing downward through the packing in a direction opposite to or counter-current to the flow of gases, the waste gases passing out through the waste pipe 15. However, in this form of apparatus I employ a plurality of saturation chambers or casings connected in series and shown at 5', 6' and 7', the uppermost casing 5' being connected with the tower 4 through the conduit or flue 4'. The two lowermost casings 6' and 7' are surrounded by the common steam jacket shown at 10', the steam being admitted through the pipe 11' while water of condensation escapes through the drain pipe 12'. The ammonia gas is admitted preferably to the central casing 6' through the valved supply pipe 14', and the fine, dry crystals are finally removed through the valved discharge tube 13' depending from the lowermost casing 7'. Within each of the casings 5', 6' and 7' I arrange a screw conveyer and these various screw conveyers are preferably connected in driving relation through gear 8'.

The operation of this apparatus is substantially the same as that described for the apparatus shown in Figs. 1 and 2, the diluted phosphoric acid flowing into the uppermost casing 5', thence through the central casing 6' where it meets the incoming ammonia gas. The conveyer in the uppermost chamber tends to feed the acid down into the second casing 6', where the ammonia and acid are mixed, the resulting crystals being gradually dried, in their travel to the lowermost chamber 7', until they are pushed out by the conveyer in such chamber in fine, stable, non-hygroscopic dry form.

In this apparatus it will be noted that the operation is also continuous and no subsequent drying of the crystals is necessary.

What I claim is:

1. The herein described process of manufacturing ammonium phosphate crystals comprising subjecting a stream of phosphoric acid to the action of a stream of ammonia, utilizing the heat of neutralization and externally applying heat for the purpose of drying the crystals resulting from the mixture of phosphoric acid and ammonia.

2. The herein described process of manufacturing ammonium phosphate crystals comprising subjecting a stream of phosphoric acid flowing in one direction to the action of a stream of ammonia flowing in the opposite direction to form the crystals, heating the latter to dry the same, and further drying the crystals by the action of air.

3. The herein described process of manufacturing ammonium phosphate crystals and comprising subjecting a stream of preheated phosphoric acid flowing in one direction to the action of a stream of ammonia flowing in the opposite direction, and drying the resultant crystals by the action of heat and an air blast.

4. The herein described process of manufacturing ammonium phosphate crystals comprising showering a stream of phosphoric acid downward and then conducting the acid in a stream into contact with ammonia gas flowing in the opposite direction, said acid being preheated by the gas, then subjecting the resultant crystals to the action of the heat of neutralization and externally applying heat to dry said crystals.

5. The herein described process of manufacturing ammonium phosphate crystals comprising subjecting a stream of diluted phosphoric acid flowing in one direction to the action of a stream of ammonia gas flowing in the opposite direction, utilizing the heat of neutralization to partially dry the resultant crystals, further heating and drying said crystals by the application of external heat, and finally drying the crystals by air to produce a fine, dry, non-hygroscopic product.

In testimony whereof I affix my signature.

INGENUIN HECHENBLEIKNER.